United States Patent [19]
Moroto et al.

[11] Patent Number: 5,683,325
[45] Date of Patent: Nov. 4, 1997

[54] AUTOMATIC TRANSMISSION FOR VEHICLE

[75] Inventors: Shuzo Moroto, Nagoya; Takao Taniguchi; Shoichi Miyagawa, both of Okazaki; Kazumasa Tsukamoto, Toyota; Masahiro Hayabuchi; Masaaki Nishida, both of Anjo; Satoru Kasuya, Hekinan; Akitoshi Kato, Takahama; Nobutada Sugiura, Nishio, all of Japan

[73] Assignee: Aisin AW Co., Ltd., Japan

[21] Appl. No.: 620,191

[22] Filed: Mar. 22, 1996

[30] Foreign Application Priority Data

Mar. 24, 1995 [JP] Japan .................. 7-90144 U

[51] Int. Cl.$^6$ ............................................. F16H 3/00
[52] U.S. Cl. ................................. 475/276; 475/277
[58] Field of Search ............................. 475/276, 277

[56] References Cited

U.S. PATENT DOCUMENTS 5,261,862  11/1993  Pierce ........................ 475/275

FOREIGN PATENT DOCUMENTS

59-117943  7/1984  Japan .
4302748  10/1992  Japan .
4341650  11/1992  Japan .

*Primary Examiner*—Dirk Wright
*Attorney, Agent, or Firm*—Lorusso & Loud

[57] ABSTRACT

A 5-speed automatic transmission for a vehicle having a highly efficient top gear, a compact construction and a wide overall range of gear ratios. The automatic transmission has a speed changer which provides five gear stages, namely two speeds on the speed decreasing side and two speeds on the speed increasing side with a direct-coupled gear therebetween. The speed changer includes a ring gear connected to an output shaft, a first carrier, a first sun gear, a second carrier connected to the first carrier, a stepped pinion gear supported by these two carriers, and a sun gear meshing with the pinion gear. The first carrier is connected to an input shaft by a clutch and the first sun gear is connected to the input shaft by a clutch. The first sun gear may be stopped by a first brake, a second brake stops the second sun gear and a third brake is provided to stop a third sun gear. Top gear is achieved by meshing of the pinion gear with the second sun gear and the ring gear. Top gear is thus achieved with the equivalent of only one planetary gear set of intermeshing elements and without loss of efficiency. Also, the arrangement of the three planetary gear sets of the transmission is such that one planetary gear set can be easily removed to make a 4-speed transmission derived from the 5-speed transmission of the invention.

6 Claims, 5 Drawing Sheets

FIG. 1

| | C-1 | C-2 | B-0_L | B-0_H | B-1 | B-2 | Gear Ratio |
|---|---|---|---|---|---|---|---|
| P | | | | | | | — |
| REV | O | | | | | O | 2.38 |
| N | O | | | | | | — |
| 1ST | O | | | | O | | 2.80 |
| 2ND | | O | | | O | | 1.53 |
| 3RD | O | O | | | | | 1.00 |
| 4TH | | O | O | | | | 0.70 |
| 5TH | | O | | O | | | 0.59 |

| | C-1 | C-2 | C-0 | B-0 | B-1 | B-2 | Gear Ratio |
|---|---|---|---|---|---|---|---|
| P | | | | | | | — |
| REV | | O | | | | O | 2.38 |
| N | | | | | | O | — |
| 1ST | O | | | | | O | 2.80 |
| 2ND | O | | | | O | | 1.53 |
| 3RD | O | | O | | | | 1.00 |
| 4TH | | | O | O | | | 0.70 |
| 5TH | | | | O | O | | 0.59 |

| | C-1 | C-2 | B-0₁ | B-0ₕ | B-1 | B-2 | Gear Ratio |
|---|---|---|---|---|---|---|---|
| P | | | | | | | — |
| REV | O | | | | | O | 2.38 |
| N | O | | | | | | — |
| 1ST | O | | | | O | | 2.80 |
| 2ND | | O | | | O | | 1.53 |
| 3RD | O | O | | | | | 1.00 |
| 4TH | | O | O | | | | 0.70 |
| 5TH | | O | | O | | | 0.59 |

| | C-1 | C-2 | C-0 | B-0 | B-1 | B-2 | Gear Ratio |
|---|---|---|---|---|---|---|---|
| P | | | | | | | — |
| REV | | O | | | | O | 2.38 |
| N | | | | | | O | — |
| 1ST | O | | | | | O | 2.80 |
| 2ND | O | | | | O | | 1.53 |
| 3RD | O | | O | | | | 1.00 |
| 4TH | | | O | | O | | 0.70 |
| 5TH | | | O | O | | | 0.59 |

AUTOMATIC TRANSMISSION FOR VEHICLE

BACKGROUND OF THE INVENTION

This invention relates to an automatic transmission for a vehicle, and particularly to a 5-speed automatic transmission having improved transmission efficiency in top gear.

Generally, to improve vehicle acceleration performance in low gears and fuel consumption in high gears, it is desirable that the overall gear ratio range of a transmission be wide. Because the speed of rotation output by a transmission is decreased in speed by a differential unit or the like, the gear ratios at the lowest and highest gear stages do not directly constitute much of a problem with regard to acceleration performance and fuel consumption. However, when for example a 4-speed transmission is given a wide overall gear ratio range, the steps between the gear ratios of adjacent gear stages become large, and because the speed range which must be covered by each gear stage is consequently wider, acceleration performance is reduced, and because the gear ratio changes greatly upon shifting, output torque fluctuations are large and cause gear shift shock. For this reason, when the overall gear ratio range is to be made large, it is necessary to add another forward gear thus providing a 5-speed transmission having five forward gears.

In one conventional 5-speed transmission, as disclosed in Japanese Unexamined Patent Publication No. H4-341650 (hereinafter called Conventional Technology 1), a speed changer uses three planetary gear sets, including first to third speeds which are underdrive gears and which decrease the speed of rotation received from an input shaft, a fourth speed which is a direct-coupled gear and which integrally rotates the planetary gear sets and outputs rotation of the input shaft unchanged in speed, and a fifth speed which is an overdrive gear and which increases the speed of rotation received from the input shaft. Another prior art 5-speed transmission, as disclosed in Japanese Unexamined Patent Publication No. H4-302748 (hereinafter called Conventional Technology 2), combines a main transmission, having two planetary gear sets for achieving 4-speeds, and an auxiliary transmission which can be changed over from an underdrive state to a directly coupled state when the main transmission is in a directly coupled state. In this latter transmission, as in the Conventional Technology 1, first to third speeds are underdrive gear stages, a fourth speed is a direct-coupled gear stage and a fifth speed is an overdrive gear stage.

These Conventional Technologies 1 and 2 have three underdrive gears, but with the direct-coupled gear stage (gear ratio 1.0) as the point of reference for distinguishing between "high" and "low", because of the need for three gears having high gear ratios on the underdrive side of the direct-coupled gear stage, and because in a gear-changing mechanism it is usual for the steps of the gear ratios to become smaller from low to high gear stages, on the low gear side the gear ratio steps are large, and the gear ratio in the first speed, which is the lowest gear, is quite large. This large gear ratio creates the problem that the frictional engagement element which brakes the reaction element for achieving the first speed must also be large. Further, because the gear ratio of the first speed is high, the output torque is high and the power transmission members must also be large, leading to an increase in size for the whole automatic transmission.

The above-described problem could conceivably be solved by reducing the number of underdrive gears and thereby avoiding increase in size of the transmission associated with the provision of large gear ratios on the low gear side, while keeping the gear ratio range wide by increasing the number of overdrive gears correspondingly; however, there are problems associated with shifting gears to the overdrive side also. That is, whereas the gear ratio at the output shaft of a vehicle must basically be substantially the same gear ratio, when many gears are overdrive gears it becomes necessary to greatly reduce the speed with a differential unit or the like, and this causes an increase in the size of that unit and, as a result, the automatic transmission becomes larger.

One way of overcoming this latter problem is to make the first and second speeds underdrive gears and make the fourth and fifth speeds overdrive gears, as disclosed in Japanese Unexamined Patent Publication No. S59-117943 (hereinafter called Conventional Technology 3) and disclosed in U.S. Pat. Specification No. 5,261,862 (hereinafter called Conventional Technology 4), which is a well-balanced solution to the above-described problem, allowing the automatic transmission to be made more compact.

However, the above-described Conventional Technologies 3 and 4 have the shortcoming that the gear efficiency, which has a large affect on the fuel consumption in top gear, improvement of which is the original purpose of using a 5-speed transmission, is poor. That is, in Conventional Technology 3, the highest gear is achieved by further adding to an overdrive gear of a main transmission an overdrive gear of an auxiliary transmission, which requires two planetary gear sets meshed with each other, i.e. in each planetary gear set meshing occurs at two locations, namely between a sun gear and a carrier and between a carrier and a ring gear, four locations in total, resulting in a decrease in gear efficiency. Also, in Conventional Technology 4, the highest gear is achieved by causing reverse rotation of a sun gear by means of a planetary gear set provided between a sun gear and a case constituting reaction elements of a planetary gear set for achieving an overdrive gear in the fourth speed, and in this case also, as in Conventional Technology 3, in top gear two planetary gear sets are meshed and this similarly results in a decrease of the gear efficiency.

SUMMARY OF THE INVENTION

Accordingly, the objectives of the present invention are to solve the problems associated with the conventional technology as described above and to provide a 5-speed automatic transmission for a vehicle having a highly efficient top gear stage while providing a wide overall gear ratio range within a compact construction.

To achieve the above-mentioned objects and other objects, the invention provides an automatic transmission having two underdrive gears, a direct-coupled gear and two overdrive gears. More specifically, the automatic transmission of the present invention includes an input shaft, an output shaft and a speed changer for achieving five forward gear stages comprising first and second speeds which decrease in speed rotation from the input shaft and transmit it at the decreased speed to the output shaft, a third speed which outputs rotation from the input shaft unchanged to the output shaft, and fourth and fifth speeds which accelerate rotation from the input shaft and transmit it to the output shaft. The speed changer has interconnected first, second and third planetary gear sets, a plurality of clutches for connecting the input shaft to predetermined speed change elements of the first, second and third planetary gear sets, and a plurality of brakes for stopping rotation of predetermined speed change elements of the first, second and third planetary gear sets. The first planetary gear set has, as speed change elements, a first ring gear drivable connected to the output shaft, a first carrier rotatably supporting a first pinion gear meshing with the first ring gear, and a first sun gear meshing with the first pinion gear. The second planetary gear set has, as speed change elements, a second carrier drivably connected to the first carrier and rotatably supporting a second pinion gear having a smaller diameter than the first pinion gear and connected to the first pinion gear in a manner preventing rotation relative thereto, and a second sun gear meshing with the second pinion gear. The plurality of clutches includes a first clutch for selectively drivably connecting the first carrier to the input shaft and the plurality of brakes includes a first brake for selectively stopping the first sun gear and a second brake for selectively stopping the second sun gear.

In one aspect of the invention, the third planetary gear set has, as speed change elements, a second ring gear drivably connected to the first carrier, a third carrier drivably connected to the first ring gear and rotatably supporting a third pinion gear meshing with the second ring gear, and a third sun gear meshing with the third pinion gear; the plurality of clutches includes a second clutch for selectively drivably connecting the first sun gear to the input shaft; and the plurality of brakes includes a third brake for selectively stopping the third sun gear.

In an automatic transmission for a vehicle according to a second aspect of the invention, the third planetary gear set has, as speed change elements, a second ring gear drivably connected to the first carrier, a third carrier drivably connected to the first ring gear and rotatably supporting a third pinion gear meshing with the second ring gear, and a third sun gear meshing with the third pinion gear; the plurality of clutches includes a second clutch for selectively drivably connecting the third sun gear to the input shaft; and the plurality of brakes includes a third brake for selectively stopping the second ring gear.

In an automatic transmission for a vehicle according to a third aspect of the invention, the third planetary gear set has, as speed change elements, a second ring gear formed integrally with the first ring gear, a third carrier connected to the first carrier and rotatably supporting a third pinion gear connected to the first pinion gear in a manner preventing rotation relative thereto and meshing with the second ring gear and a fourth pinion gear meshing with the third pinion gear, and a third sun gear meshing with the fourth pinion gear; the plurality of clutches includes a second clutch for selectively and drivably connecting the first sun gear to the input shaft; and the plurality of brakes includes a third brake for selectively stopping the third sun gear.

In an automatic transmission for a vehicle according to a fourth aspect of the invention, the plurality of brakes includes a third brake for selectively stopping the third sun gear. Such embodiments are otherwise similar to embodiments in accordance with the third aspect of the invention.

Any of the above-described automatic transmissions, in accordance with the invention, may have a construction wherein the input shaft is disposed coaxially with an engine and drivably connected to the engine, wherein disposed in order from the engine, are the third, the first and the second planetary gear sets, and wherein an output gear, which outputs rotation to the vehicle wheels, is provided on the output shaft between the engine and the third planetary gear set.

Because the automatic transmissions described above all have first and second speeds which decrease the speed of rotation transmitted to the output shaft from the input shaft, a third speed which outputs rotation from the input shaft unchanged to the output shaft, and fourth and fifth speeds which increase the input rotational speed and transmit it to the output shaft, as described above in connection with the conventional technology it is possible to make the whole transmission compact.

In the fourth speed the input shaft is connected to the first carrier of the first planetary gear set by the first clutch, the first sun gear is stopped by the first brake and rotation increased in speed from the first ring gear is output to the output shaft. In the fifth speed, although the input shaft is connected to the second carrier by way of the first carrier in the same way as in the fourth speed, instead of the first brake the second brake is engaged, and rotation of the second sun gear is thereby stopped. When this happens, because the second pinion gear is of a smaller diameter than that of the first pinion gear, the rotational speed as input at the input shaft is increased in speed more than in the fourth gear, before being output from the first ring gear. At this time, meshing occurs at two locations, namely between the second sun gear and the second pinion gear and between the first pinion gear and ring gear. In this way, top gear is achieved with the equivalent of one planetary gear set (in terms of intermeshed elements) without loss of efficiency.

Also, because in the second planetary gear set the second pinion gear is connected to the first pinion gear in a manner preventing relative rotation therebetween, there is no need to provide a ring gear in the second planetary gear set and, consequently, the automatic transmission can be made more compact.

It is necessary to make the diameter of the sun gear of the planetary gear set for the fifth speed larger in order to make the gear ratio smaller, as compared with the planetary gear set for the fourth speed, but when the diameter of the ring gear of the planetary gear set for the fifth speed is the same as that of the planetary gear set for the fourth speed, the diameter of the pinion gear of the planetary gear set for the fifth speed is then too small for that pinion gear properly fabricated. For this reason, it is necessary to make the diameter of the ring gear of the planetary gear set for the fifth speed larger, and the external diameter of the transmission is consequently increased. However, in the case of this invention, because the second pinion gear has a smaller diameter than that of the first pinion gear and is connected to the first pinion gear non-rotatably relative thereto, with the first and second carriers which support the first and second pinion gears being connected, the diameter of the sun gear of the planetary gear set for the fifth gear need not be so large and consequently the pinion gear of the planetary gear set for the fifth gear can be easily made and the external diameter of the transmission is minimized.

In particular, in an automatic transmission for a vehicle according to a preferred embodiment of the invention, because the second planetary gear set, is axially disposed outward of a counter gear, the third planetary gear set and the first planetary gear set, relative to the engine, it is possible to remove the second planetary gear set with minimal affect on the counter gear, the third planetary gear set and the first planetary gear set, which are the principal components of a 4 forward speed transmission and, by doing so, it is possible to easily convert a 5-speed transmission according to the invention into a 4-speed transmission. As a result, standardization of parts and common use of a transmission manufacturing line become possible, and reduction in production costs can thereby be achieved.

DETAILED DESCRIPTION OF THE PREFERRED EMBODIMENTS

Preferred embodiments of the invention will now be described with reference to the accompanying drawings. The four preferred embodiments described below all have in common, as a basic structure, a 4-speed gear train having an overdrive in the fourth speed (4TH) effected with carrier input, sun gear reaction and ring gear output. Such structure provides a 5-speed automatic transmission by making an overdrive pinion gear of a planetary gear set for achieving fourth speed an integral with another pinion gear of smaller diameter to provide a stepped pinion gear.

Figure 1:
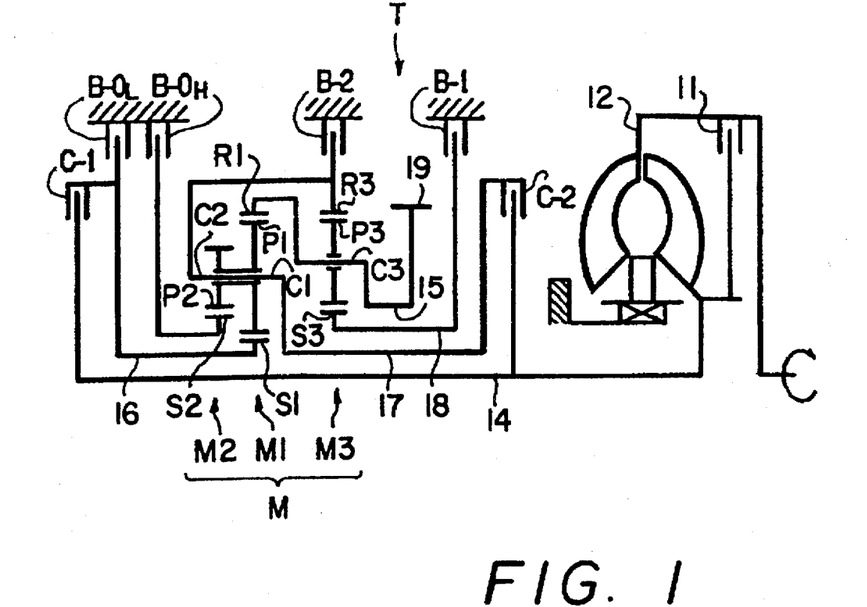
FIG. 1 is a skeletal diagram showing the overall construction of an automatic transmission for a vehicle according to a first preferred embodiment of the invention.

FIG. 1 is a skeletal diagram of a first preferred embodiment of the invention wherein the above-described 4-speed gear train is made by connecting the carriers and ring gears of two planetary gear sets. When this 4-speed gear train is provided with two clutches and three brakes it is converted into 5-speed transmission in accordance with the present invention. This automatic transmission T has an input shaft 14, an output shaft and a speed changer M and provides five speeds including first and second speeds (1ST, 2ND) which decrease the speed received from the input shaft 14 and transmit it to the output shaft 15, a third speed (3RD) which outputs rotation from the input shaft 14 unchanged to the output shaft 15 and fourth and fifth speeds (4TH, 5TH) which increase in speed the rotation received from the input shaft 14 and transmit it to the output shaft 15.

The speed changer M has interconnected first, second and third planetary gear sets M1, M2 and M3, a plurality of clutches for connecting the input shaft 14 with predetermined speed change elements of the first, second and third planetary gear sets M1, M2, M3, and a plurality of brakes for stopping rotation of predetermined speed change elements of the first, second and third planetary gear sets M1, M2, M3.

The first planetary gear set M1 has, as speed change elements, a first ring gear R1 drivably connected to the output shaft 15, a first carrier C1 rotatably supporting a first pinion gear P1 meshing with the first ring gear R1, and a first sun gear S1 meshing with the first pinion gear P1.

The second planetary gear set M2 has, as speed change elements, a second carrier C2 drivable connected to the first carrier C1 and rotatably supporting a second pinion gear P2 having a smaller diameter than the first pinion gear P1 and connected to the first pinion gear P1 non-rotatably relative thereto, and a second sun gear S2 meshing with the second pinion gear P2.

In this first preferred embodiment, the third planetary gear set M3 has, as speed change elements, a second ring gear R3 drivably connected to the first carrier C1, a third carrier C3 drivably connected to the first ring gear R1 and rotatably supporting a third pinion gear P3 meshing with the second ring gear R3, and a third sun gear S3 meshing with the third pinion gear P3.

The plurality of clutches is made up of a first clutch (C-2) for selectively and drivably connecting the first carrier C1 to the input shaft 14 and a second clutch (C-1) for selectively and drivably connecting the first sun gear S1 to the input shaft 14.

The brakes include a first brake (B-$0_L$) for selectively stopping the first sun gear S1, a second brake (B-$O_H$) for selectively stopping the second sun gear S2 and a third brake (B-1) for selectively stopping the third sun gear S3. Besides these, a brake (B-2) for braking the carrier C1 is also provided, but the function of this brake is achieving reverse gear and it is not directly related to the forward gears which are the subject of this invention.

The input shaft 14 is disposed coaxially with an engine of a vehicle (not shown in the drawings) and is driven by the engine by way of a torque convertor 12 having a lockup clutch 11. The first, second and third planetary gear sets M1, M2 and M3 are disposed, in order from the engine: M3, M1 and M2. An output gear 19, which outputs rotation to the vehicle wheels, is provided on the output shaft 15 between the engine and the third planetary gear set M3. Thus, the transmission of the present invention is a transverse-type automatic transmission. In FIG. 1, a sun gear shaft 16 is connected to the sun gear S1 through the clutch (C-1). A carrier shaft 17 is connected to the carrier C1 through the clutch (C-2). A sun gear shaft 18 is connected to the sun gear S3 through the brake (B-1).

Figure 2:
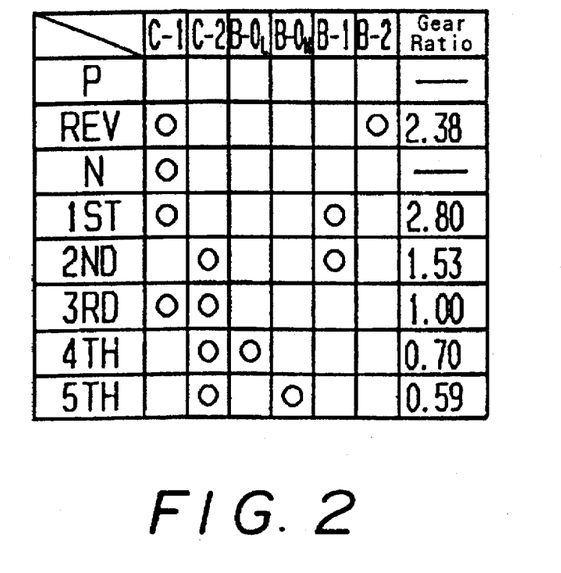
FIG. 2 is an operation table for the transmission shown in FIG. 1.

Various gear stages are achieved by supplying hydraulic pressure to hydraulic servos for actuating the various clutches and brakes as shown in FIG. 2, under control of a hydraulic control unit (not shown in the drawings). The clutches and brakes are either engaged ("O" symbol) or released (a blank space), as shown in FIG. 2. Specifically, the first speed (1ST) is achieved when the clutch (C-1) and the brake (B-1) are engaged. In first speed, rotation of the input shaft 14 is transmitted to the first sun gear S1 via the clutch (C-1) and is output to the output gear 19 as rotation of the carrier C3, decreased in speed by the braking of the sun gear S3 by the engagement of the brake (B-1). The second speed (2ND) is achieved by engagement of the clutch (C-2) and the brake (B-1). In second speed, rotation received by the carrier shaft 17 via the clutch (C-2) is transmitted to the second ring gear R3, with its speed unchanged, via the carrier C1 and the carrier C2, and is output to the output gear 19 as differential rotation of the carrier C3 with the sun gear S3, braked by the engagement of the brake (B-1), serving as a reaction element. The third speed (3RD) is achieved by direct coupling of the first planetary gear set M1 by engagement of both of the clutches C-1 and C-2. At this time, rotation of the input shaft 14 is output to the output gear 19, unchanged in speed, as rotation of the carrier C3.

The overdrive fourth speed (4TH) is achieved by engagement of the clutch (C-2) and engagement of the brake (B-$0_L$) which brakes the sun gear S1. In fourth speed, rotation of the input shaft 14 is transmitted to the output gear 19 from the carrier C3 as rotation of the ring gear R1, having been increased in rotational speed relative to that of the carrier C1 by an amount corresponding to autorotation of the first pinion gear P1.

Top gear, i.e. the fifth speed, which is the main subject of this invention, is achieved by engagement of the clutch C-2 and engagement of the brake B-$0_H$, whereupon rotation of the input shaft 14 is transmitted to the output gear 19 from the carrier C3 as rotation of the first ring gear R1, having been further increased in rotational speed relative to that of the carrier C1 by an amount corresponding to autorotation of the small diameter pinion gear P2, utilizing the sun gear S2 as a reaction element, sun gear S2 having a larger diameter than that of the first sun gear S1 used to achieve the fourth speed. In fifth speed, meshing occurs in two locations, namely between the second sun gear S2 and the pinion gear P2 and between the pinion gear P1 and the ring gear R1, and top gear is achieved with the equivalent of only one planetary gear set, in terms of intermeshing elements, and therefore without loss of efficiency.

Reverse gear (REV) is achieved by engagement of the clutch (C-1) and the brake (B-2), and at this time rotation of the ring gear R1, rotating in reverse and decreased in speed with respect to the input of the sun gear S1 by the braking of the first carrier C1, is output from the output gear 19 via the third carrier C3.

Because the transmission described above has five speeds made up of first and second speeds which decrease the input speed from the input shaft 14 and transmit to the output shaft 15, a third speed which outputs rotation from the input shaft 14 without speed change to the output shaft 15, and fourth and fifth speeds which accelerate speed of the input rotation and transmit it to the output shaft 15, it is possible to make a compact transmission while obtaining a wide gear ratio range as shown in FIG. 2. Also, because the second planetary gear set M2 has a second pinion gear P2 connected to the first pinion gear P1 non-rotatably relative thereto, it is not necessary to provide a ring gear in the second planetary gear set M2 and, in this respect also, the automatic transmission T can be made more compact.

Figure 9A:
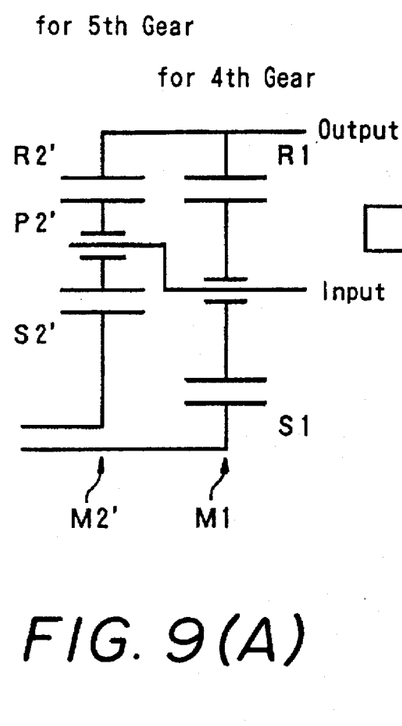
FIGS. 9(A) and 9(B) are skeletal diagrams of conventional speed-changers.
Figure 9B:
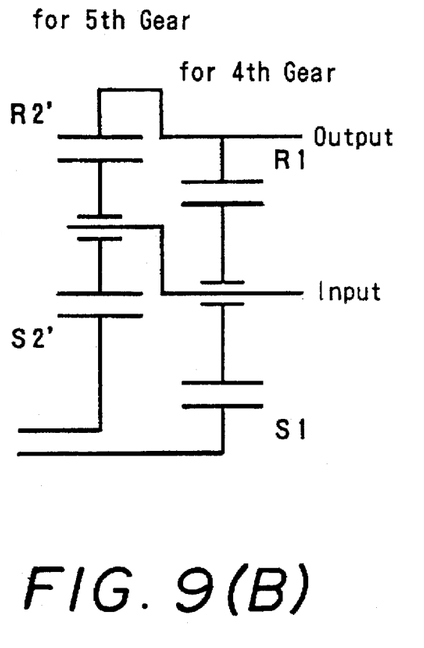
Figure 10:
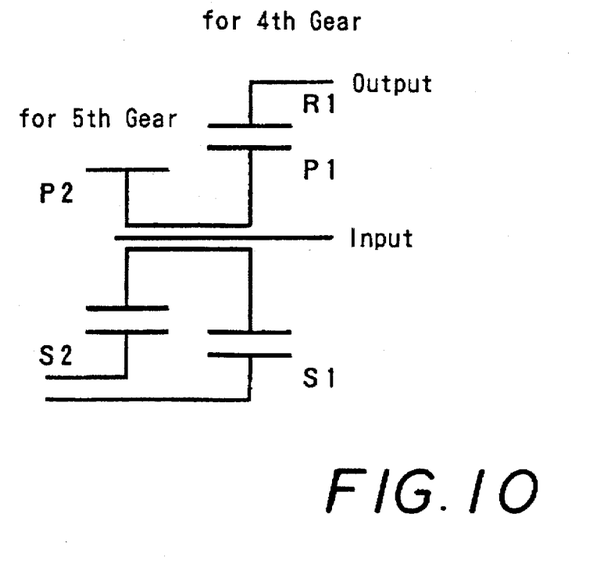
FIG. 10 is a skeletal diagram of a characteristic part of a speed changer according to the present invention.

Furthermore, as compared to the conventional speed changers shown in FIGS. 9(A) and 9(B) which achieve an efficient fifth speed by provision of a second planetary gear set M2' which is similar to the first planetary gear set M1 for the fourth speed, the above-described first preferred embodiment allows for a more compact automatic transmission. That is, it is necessary for the gear ratio of the second planetary gear set M2' for the fifth speed to be smaller than that of the first planetary gear set M1 for the fourth speed. Accordingly, in the case of the conventional speed changers shown in FIGS. 9(A) and 9(B), the gear ratio of the fifth speed, designating the number of teeth of the sun gear S2' as $Z_{S2}$ and the number of teeth of the ring gear R2' as $Z_{R2}$, is $1/(1+Z_{S2}/Z_{R2})$, and it is necessary to provide a relatively large number of teeth (a number in general proportional to the gear diameter) on the sun gear S2'. However, when the diameter of the ring gear R2', as shown in FIG. 9(A) of the drawings, is the same as the diameter of the ring gear R1 of the fourth speed, the diameter of the pinion gear P2' becomes too small for it to be practically usable. For this reason, the diameter of the ring gear R2' must be increased, but when this is done, as shown in (B) of the drawing, the external diameter of the transmission must likewise be increased. In contrast, in the case of the above-described preferred embodiment, having the gear construction shown in FIG. 10, the fifth speed gear ratio is $1/(1+Z_{P1}/Z_{P2} \cdot Z_{S2}/Z_{R1})$, wherein the number of teeth of the sun gear S2 is designated $Z_{S2}$, the number of teeth of the ring gear R1 is designated $Z_{R1}$, the number of teeth of the pinion gear P1 is designated $Z_{P1}$ and the number of teeth of the pinion gear P2 is $Z_{P2}$. Because the diameter of the sun gear S2 need not be as large as in the conventional design shown in FIGS. 9(A) and 9(B), the pinion gear P2 may have a diameter sufficient to be practical and the external diameter of the transmission is minimized.

A 4-speed gear-changing mechanism can be made from the design of the 5-speed gear-changing mechanism of the above-described preferred embodiment, as is clear from FIG. 1, by removing the second planetary gear set M2 and the second brake (B-$O_H$). In the above-described preferred embodiment, the second planetary gear set M2 is disposed, relative to the engine, axially outward of the output gear 19, the third planetary gear set M3 and the first planetary gear set M1 and, consequently, with minimal affect (i.e. changes of positions and the like) on the output gear 19, the third planetary gear set M3 and the first planetary gear set M1, which are the principal components of a 4-speed transmission, it is possible to easily convert to a 4-speed transmission by removing the second planetary gear set M2. Making use of this positional relationship of the second planetary gear set M2 to the remainder of the components of the 5-speed transmission of the foregoing preferred embodiment, parts can be shared in common with a 4-speed transmission and common use of an assembly line and the like become possible, thus allowing reductions in production costs.

Figure 3:
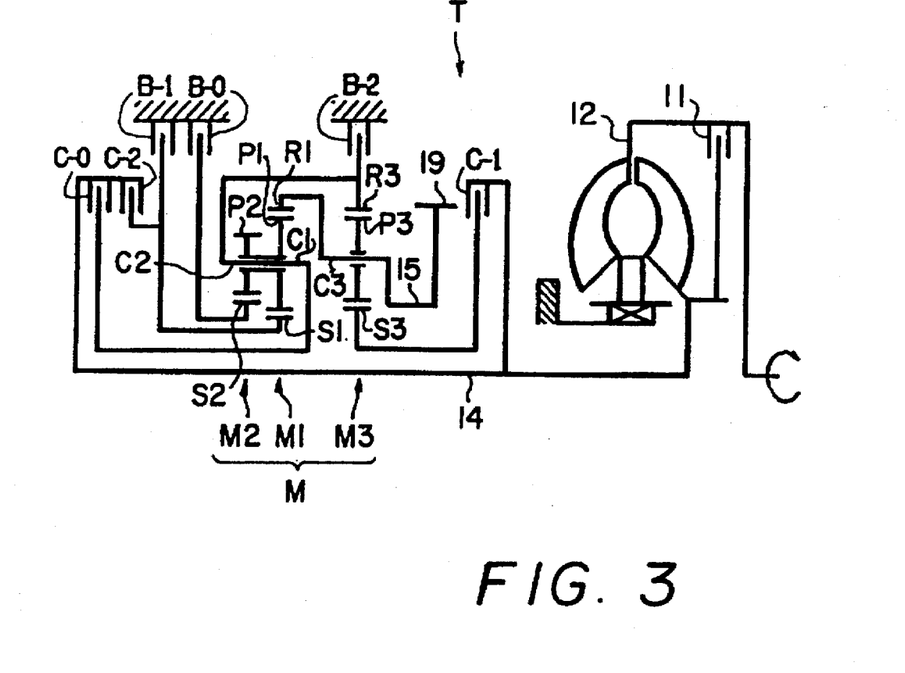
FIG. 3 is a skeletal diagram showing the overall construction of an automatic transmission for a vehicle according to a second preferred embodiment of the invention.

FIG. 3 is a skeletal diagram of a second preferred embodiment of the invention wherein a 5-speed transmission is made by adding a stepped pinion gear to a 4-speed transmission comprising a gear train similar to that of the first preferred embodiment, but differing therefrom in that it has three clutches and two brakes.

Here, in the interest of brevity, only the points of difference between this second preferred embodiment and the previously described first preferred embodiment will be described. In this second preferred embodiment, the plurality of clutches includes a first clutch (C-0) for selectively and drivably connecting the first carrier C1 to the input shaft 14 and a second clutch (C-1) for selectively and drivably connecting the third sun gear S3 to the input shaft 14. A clutch (C-2) dedicated to achieving reverse gear (REV) is also provided.

The plurality of brakes includes a first brake (B-1) for selectively stopping the first sun gear S1, a second brake (B-0) for selectively stopping the second sun gear S2 and a third brake (B-2) for selectively stopping the second ring gear R3.

Figure 4:
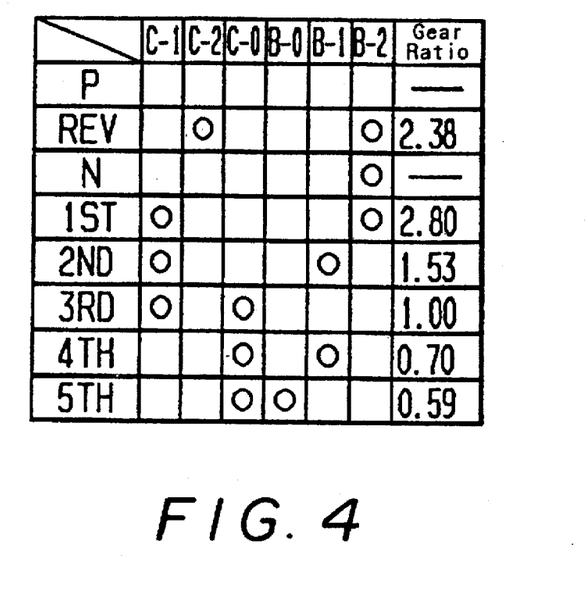
FIG. 4 is an operation table for the transmission shown in FIG. 3.

The relationships between the engaged and the released states of the clutches and the brakes in the various gear stages are as shown in the operation table of FIG. 4. That is, the first speed (1ST) is achieved by engagement of the clutch (C-1) and the brake (B-2), whereupon rotation of the input shaft 14 is transmitted to the sun gear S3 via the clutch (C-1) and output as rotation of the carrier C3, decreased in speed by braking of the ring gear R3 by the engagement of the brake (B-2). The second speed (2ND) is achieved by engagement of the clutch (C-1) and the brake (B-1), and input from the clutch (C-1) to the sun gear S3 is output as rotation of the carrier C3 with the sun gear S1 braked by the engagement of the brake (B-1) as a reaction element. The third speed (3RD) is achieved by direct coupling of the third planetary gear set M3 by engagement of both of the clutches (C-0, C-1), whereupon rotation of the input shaft 14 is output unchanged to the output gear 19 as rotation of the carrier C3.

The overdrive fourth speed (4TH) is achieved by engagement of the clutch (C-0) and engagement of the brake (B-1) to brake the sun gear S1, whereupon rotation of the input shaft 14 is output from the carrier C3 as rotation of the ring gear R1, at a speed higher than that of rotation of the carrier C1 by an amount corresponding to autorotation of the pinion gear P1.

Top gear, i.e. the fifth speed (5TH), which is the main subject of this invention, is achieved by engagement of the clutch (C-0) and engagement of the brake (B-0), whereupon rotation of the input shaft 14 is output from the carrier C3 as rotation of the ring gear R1, at a speed higher than that of rotation of the carrier C1 by an amount corresponding to autorotation of the small-diameter pinion gear P2, with the sun gear S2 serving as a reaction element. The sun gear S2 has a larger diameter than the first sun gear S1 used to achieve the fourth speed. As in the first embodiment, meshing occurs in two locations, namely between the second sun gear S2 and the pinion gear P2 and between the pinion gear P1 and the ring gear R1, and thus top gear is achieved with the equivalent of only one planetary gear set, in terms of meshing elements, and without loss in efficiency. The reverse gear (REV) in this embodiment is achieved by engagement of the clutch (C-2) and the brake (B2), whereupon rotation of the ring gear R1, rotating in reverse and decreased in speed relative to the input of the sun gear S1 as a result of the braking of the carrier C1, is output from the output gear 19 via the carrier C3. In this way, this embodiment obtains the same effects as the first preferred embodiment.

Figure 5:
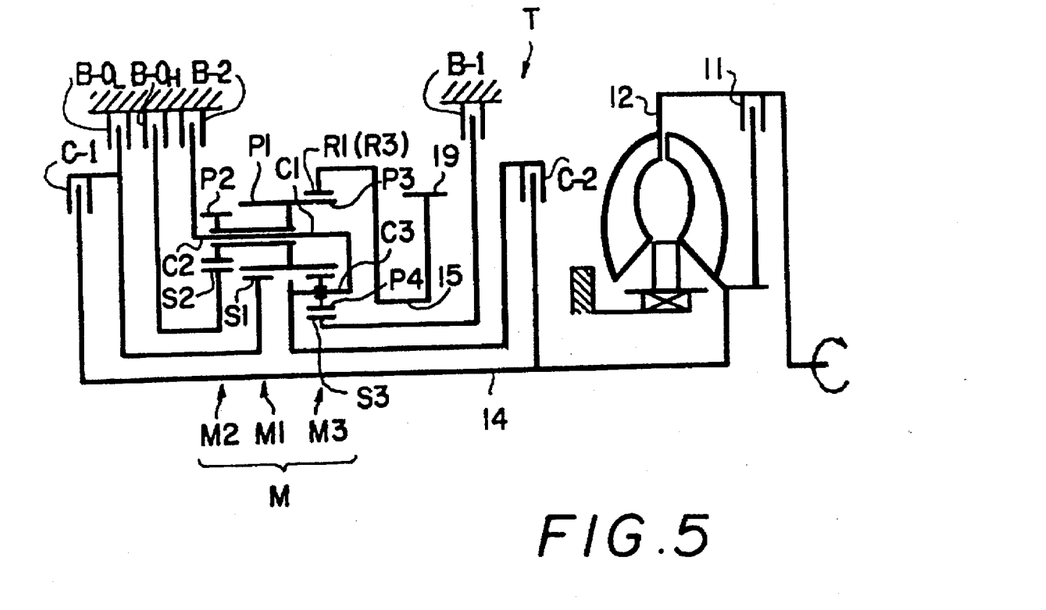
FIG. 5 is a skeletal diagram showing the overall construction of an automatic transmission for a vehicle according to a third preferred embodiment of the invention.

FIG. 5 is a skeletal diagram of a third preferred embodiment of the invention wherein a 5-speed transmission is made by adding a stepped pinion gear to a 4-speed transmission comprising a Ravigneaux type gear train, unlike the gear trains of the first and second preferred embodiments, with two clutches and three brakes as in the first preferred embodiment.

In describing this third preferred embodiment also, in the interest of brevity, only the points of difference will be described. In this preferred embodiment, a planetary gear set M1 has, as speed change elements, a first ring gear R1 drivably connected to an output shaft 15, a first carrier C1 rotatably supporting a first pinion gear P1 meshing with the first ring gear R1, and a first sun gear S1 meshing with the first pinion gear P1. A second planetary gear set M2 has, as speed change elements, a second carrier C2 drivably connected to the first carrier C1 and rotatably supporting a second pinion gear P2, which has a smaller diameter than the first pinion gear P1 and is connected to the first pinion gear P1 nonrotatably relative thereto, and a second sun gear S2 meshing with the second pinion gear P2. The third planetary gear set M3 has, as speed change elements, a third carrier C3 connected to the first carrier C1 and rotatably supporting a third pinion gear P3, connected to the first pinion gear P1 nonrotatably relative thereto and meshing with a second ring gear R3 and a fourth pinion gear P4 meshing with the third pinion gear P3, and a third sun gear S3 meshing with the fourth pinion gear P4.

The clutches in this embodiment include a first clutch (C-2) for selectively and drivably connecting the first carrier C1 to the input shaft 14 and a second clutch (C-1) for selectively and drivably connecting the first sun gear S1 to the input shaft 14.

The brakes of this third embodiment include a first brake (B-0$_L$) for selectively stopping the first sun gear S1, a second brake (B-O$_H$) for selectively stopping the second sun gear S2, a third brake (B-1) for selectively stopping the third sun gear S3, and a brake (B-2) engaged only for establishing reverse.

Figure 6:
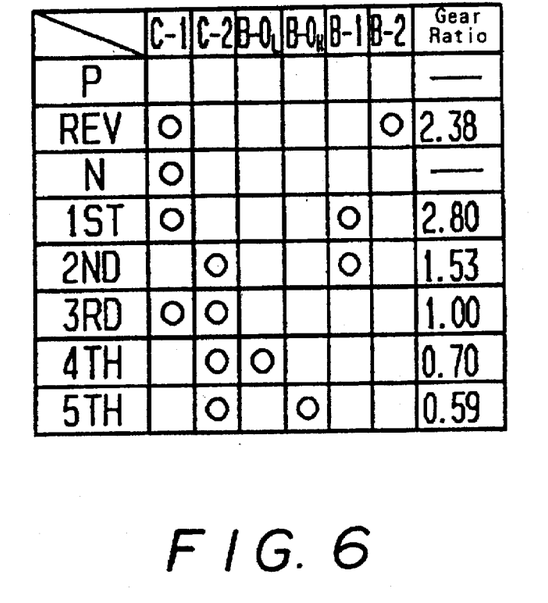
FIG. 6 is an operation table for the transmission shown in FIG. 5.

The relationships between the engagement and the release of the clutches and the brakes in the various gear stages in this embodiment are, as shown in the operation table of FIG. 6, exactly the same as in the case of the first preferred embodiment. Accordingly, explaining only the power paths between the speed change elements, in the first speed, the input of the sun gear S1 becomes the output of the second ring gear R3 as a result of rotation of the intermeshed pinion gears P1, P4 having the sun gear S3 as a reaction element. In the second speed, the input of the carrier C3 becomes the output of the second ring gear R3 as a result of rotation of the intermeshed pinion gears P1, P4 having the sun gear S3 as a reaction element. In the third speed, the simultaneous input to the sun gear S1 and the carrier C3 makes the first planetary gear set M1 directly coupled and this input becomes the output of the ring gear R3 without change in speed.

In the fourth speed, which is an overdrive speed, with respect to carrier C3 input, the sun gear S1 becomes a reaction element, and rotation is increased in speed by an amount corresponding to autorotation of the pinion gear P1 and output to the ring gear R3. In the fifth speed, similar to input to carrier C3, the sun gear S2 becomes a reaction element, and rotation is further increased in speed by an amount corresponding to autorotation of the pinion gear P2 and is output to the ring gear R3. The effects thus obtained are the same as in the case of the first preferred embodiment.

Figure 7:
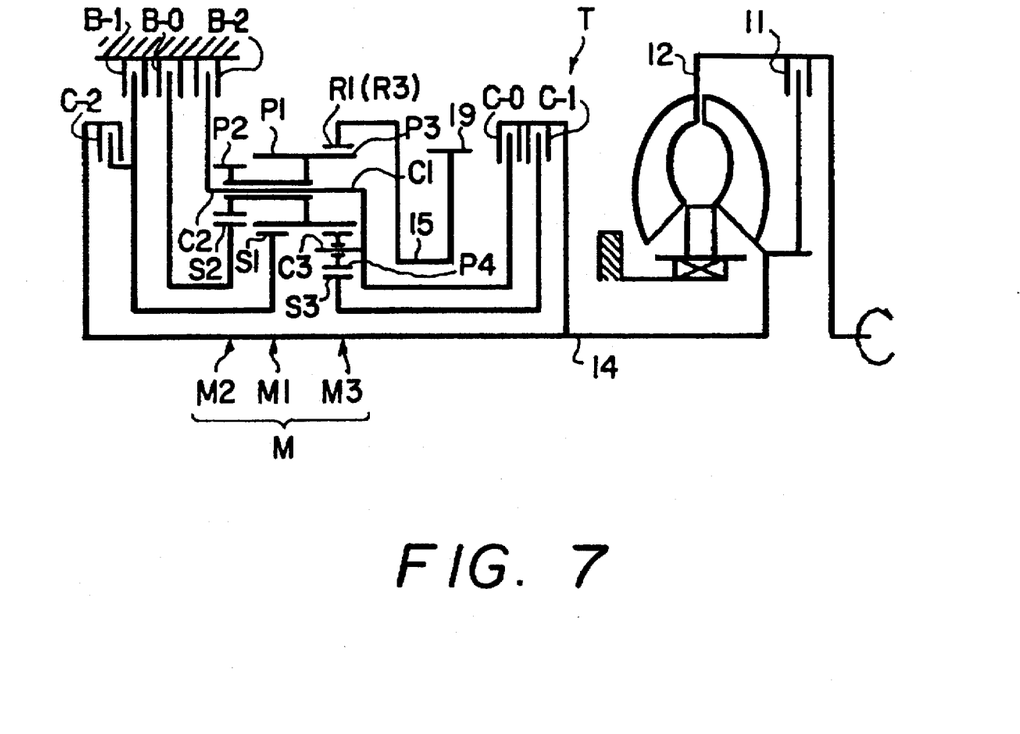
FIG. 7 is a skeletal diagram showing the overall construction of an automatic transmission for a vehicle according to a fourth preferred embodiment of the invention.

Finally, FIG. 7 is a skeletal view of a fourth preferred embodiment of the invention. This example is a 5-speed transmission formed by combining a stepped pinion gear and a 4-speed transmission comprising a gear train identical to that of the third preferred embodiment but differing from the third preferred embodiment in that it is provided with three clutches and two brakes.

In treating this fourth preferred embodiment also, only the points of difference will be described. In this fourth preferred embodiment, the plurality of clutches includes a first clutch (C-0) for selectively and drivably connecting the first carrier C1 to the input shaft 14, a second clutch (C-1) for selectively and drivably connecting the third sun gear S3 to the input shaft 14, and a clutch (C-2) provided solely for achieving reverse gear (REV).

The plurality of brakes includes a first brake (B-1) for selectively stopping the first sun gear S1, a second brake (B-O) for selectively stopping the second sun gear S2 and a third brake (B-2) for selectively stopping the second carrier C2.

Figure 8:
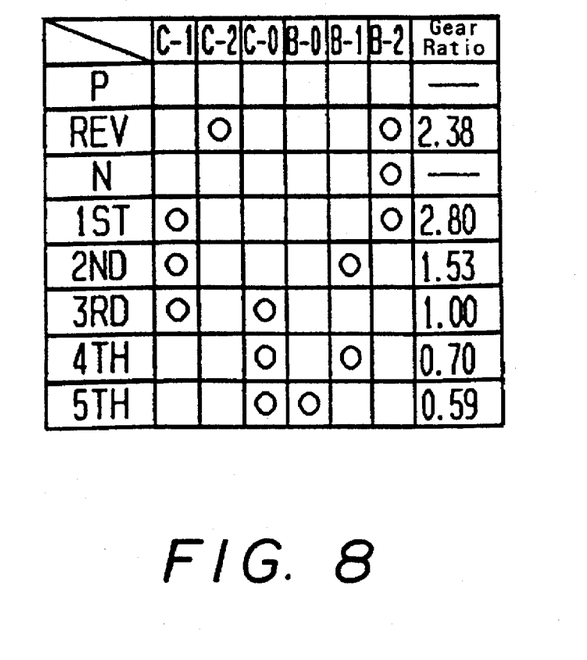
FIG. 8 is an operation table for the transmission shown in FIG. 7.

The relationships between the engagement and the release of the clutches and the brakes in the various gear stages in this fourth preferred embodiment are as shown in the operation table of FIG. 8. The first speed (1ST) is achieved by engagement of the clutch (C-1) and the brake (B-2). At this time, rotation of the input shaft 14 is transmitted to the sun gear S3 via the clutch (C-1) and is output as rotation of the ring gear R1 (R3), decreased in speed by the braking of the carriers C1, C3 by the engagement of the brake (B-2). The second speed (2ND) is achieved by engagement of the clutch (C-1) and the brake (B-1), and input from the clutch (C-1) to the sun gear S3, is output as rotation of the ring gear R1 (R3) having the sun gear S1 braked by the engagement of the brake (B-1) as a reaction element. The third speed (3RD) is achieved by direct coupling of the third planetary gear set M3 by engagement of both of the clutches (C-0, C-1), and rotation of the input shaft 14 is output to the output gear 19, unchanged in speed, as rotation of the ring gear R1 (R3).

The overdrive fourth speed (4TH) is achieved by engagement of the clutch (C-0) and engagement of the brake (B-1) which brakes the sun gear S1, and rotation of the input shaft 14 is output as rotation of the ring gear R1 (R3) increased in speed with respect to rotation of the first carrier C1 by an amount corresponding to autorotation of the pinion gear P1. Top gear, i.e. the fifth speed (5TH), which is the main subject of this invention, is achieved by engagement of the clutch (C-0) and engagement of the brake (B-0), whereupon rotation of the input shaft 14 is output as rotation of the ring gear R1 (R3), further increased in speed with respect to rotation of the carrier C1 by an amount corresponding to autorotation of the small-diameter pinion gear P2, with the sun gear S2 acting as a reaction element. The sun gear S2 has a larger diameter than that of the first sun gear S1 used to achieve the fourth speed. In fifth speed, as in the previous preferred embodiments, meshing occurs at two locations, namely between the second sun gear S2 and the pinion gear P2 and between the pinion gear P1 and the ring gear R1 (R3, and top gear is achieved with the equivalent of one planetary gear set of intermeshed elements. The reverse gear (REV) in this example is achieved by engagement of the clutch (C-2) and the brake (B-2), and output is the rotation of the ring gear R1 (R3), rotating in reverse and decreased in speed with respect to the carrier C1 as a result of the braking of the sun gear S2. In this way, this embodiment also provides the same effects as in the first preferred embodiment.

In all the preferred embodiments described above, a 4-speed automatic transmission, in which the fourth speed (4TH) is supplied by an overdrive gear, is converted to a 5-speed transmission by making a first pinion gear P1 for the overdrive gear a stepped pinion gear, i.e. by combining it with a second pinion gear P2 of smaller diameter, and adding a sun gear S2 and brakes (B-O, B-O$_H$). In such a construction, because the gear ratios at the underdrive gear side do not change, the reaction elements need not be enlarged, and because the ring gear R1 is shared in common and the carriers C1, C2 are integrated, the transmission is compact and the gear efficiency in the fifth speed (5TH) is good because the amount of meshing is the same as in an ordinary overdrive.

The invention has been described in detail above on the basis of four specific preferred embodiments; however, the invention is not limited to the preferred embodiments described above, and various changes to these embodiments can be made within the scope of the invention as set forth in the claims which follow.

What is claimed is:

1. An automatic transmission for a vehicle having an input shaft, an output shaft and a speed changer for achieving five forward gear stages comprising first and second speed stages which decrease speed of rotation received from the input shaft and transmit it to the output shaft, a third speed stage which transmits rotation from the input shaft, unchanged in speed, to the output shaft, and fourth and fifth speed stages which increase speed of rotation received from the input shaft and transmit it to the output shaft, said speed changer comprising:

interconnected first, second and third planetary gear sets;
said first planetary gear set including, as speed change elements, a first ring gear drivably connected to the output shaft, a first carrier rotatably supporting a first pinion gear meshing with the first ring gear, and a first sun gear meshing with the first pinion gear; said second planetary gear set including, as speed change elements, a second carrier drivably connected to the first carrier and rotatably supporting a second pinion gear having a smaller diameter than the first pinion gear and connected to the first pinion gear in a manner preventing rotation relative thereto, and a second sun gear meshing with the second pinion gear;
a plurality of clutches, for connecting the input shaft to predetermined speed change elements of the first, second and third planetary gear sets, including a first clutch for selectively drivably connecting the first carrier to the input shaft; and
a plurality of brakes, for stopping predetermined speed change elements of the first, second and third planetary gear sets, including a first brake for selectively stopping the first sun gear and a second brake for selectively stopping the second sun gear.

2. An automatic transmission for a vehicle according to claim 1 wherein:

said third planetary gear set comprises, as speed change elements, a second ring gear drivably connected to the first carrier, a third carrier drivably connected to the first ring gear and rotatably supporting a third pinion gear meshing with the second ring gear, and a third sun gear meshing with the third pinion gear;
said plurality of clutches further includes a second clutch for selectively drivably connecting the first sun gear to the input shaft; and
said plurality of brakes further includes a third brake for selectively stopping the third sun gear.

3. An automatic transmission for a vehicle according to claim 1 wherein:

said third planetary gear set comprises, as speed change elements, a second ring gear drivably connected to the first carrier, a third carrier drivably connected to the first ring gear and rotatably supporting a third pinion gear meshing with the second ring gear, and a third sun gear meshing with the third pinion gear;
said plurality of clutches further includes a second clutch for selectively drivably connecting the third sun gear to the input shaft; and
said plurality of brakes includes a third brake for selectively stopping the second ring gear.

4. An automatic transmission for a vehicle according to claim 1 wherein:

said third planetary gear set comprises, as speed change elements, a second ring gear formed integrally with the first ring gear, a third carrier connected to the first carrier and rotatably supporting a third pinion gear, said third pinion gear being connected to the first pinion gear in a manner preventing rotation relative thereto and meshing with the second ring gear and with a fourth pinion gear meshing with the third pinion gear, and a third sun gear meshing with the fourth pinion gear;
said plurality of clutches further includes a second clutch for selectively drivably connecting the first sun gear to the input shaft; and
said plurality of brakes further includes a third brake for selectively stopping the third sun gear.

5. An automatic transmission for a vehicle according to claim 1 wherein:

said third planetary gear set comprises, as speed change elements, a second ring gear formed integrally with the first ring gear, a third carrier connected to the first carrier and rotatably supporting a third pinion gear connected to the first pinion gear in a manner preventing rotation relative thereto and meshing with the second ring gear and with a fourth pinion gear meshing with the third pinion gear, and a third sun gear meshing with the fourth pinion gear;

said plurality of clutches further includes a second clutch for selectively drivable connecting the third sun gear to the input shaft; and said plurality of brakes further includes a third brake for selectively stopping the third carrier.

6. An automatic transmission for a vehicle according to claim 1 wherein:

said input shaft is disposed coaxially with an engine and is drivably connected to the engine and, in the order from the engine, are arranged, in succession, the third, the first and the second planetary gear sets; and an output gear for outputting rotation to vehicle wheels is provided on the output shaft between the engine and the third planetary gear set.

* * * * *